Sept. 5, 1967 W. D. HUTCHENS 3,339,887
BALANCED BALL VALVE HAVING PRESSURE REDUCING FLOW RING
Filed Jan. 28, 1965 2 Sheets-Sheet 1
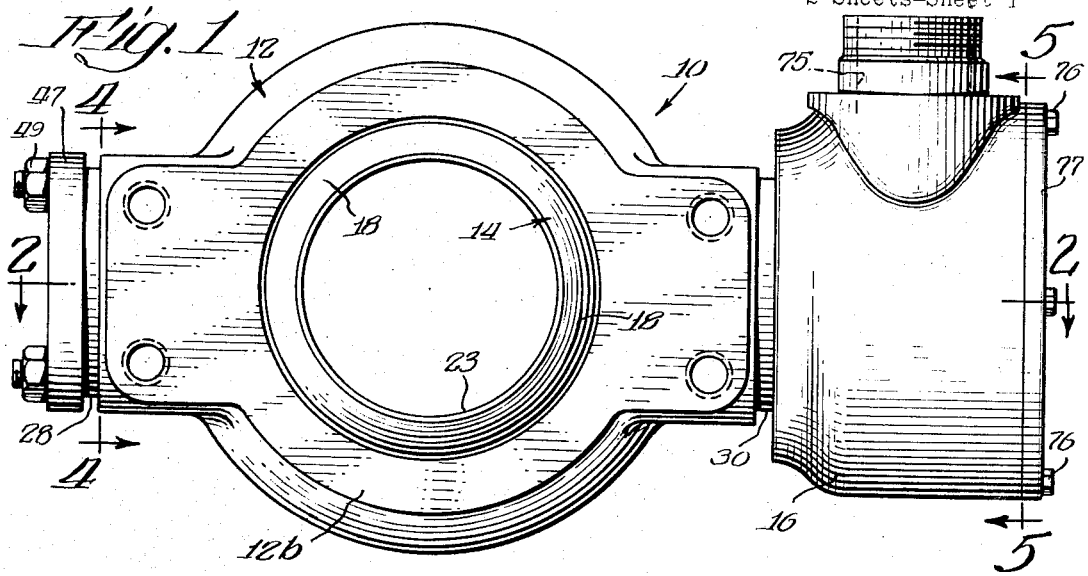
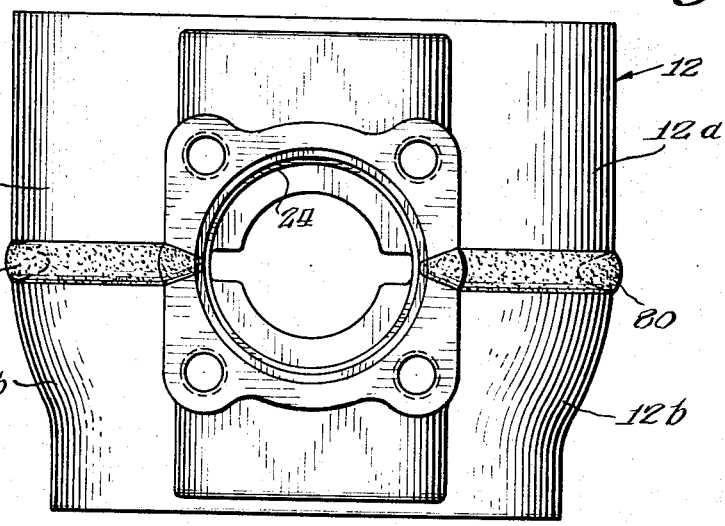
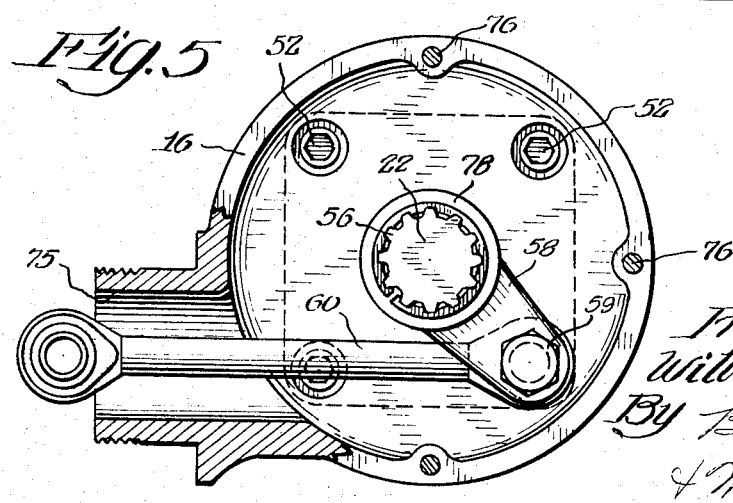
Inventor:
Wilbur D. Hutchens
By Bair, Freeman
& Molinare Attys Sept. 5, 1967  W. D. HUTCHENS  3,339,887
BALANCED BALL VALVE HAVING PRESSURE REDUCING FLOW RING
Filed Jan. 28, 1965  2 Sheets-Sheet 2

Inventor:
Wilbur D. Hutchens
By Bair, Freeman & Molinare Attys.

United States Patent Office 3,339,887
Patented Sept. 5, 1967

3,339,887
BALANCED BALL VALVE HAVING PRESSURE REDUCING FLOW RING
Wilbur D. Hutchens, Marshalltown, Iowa, assignor to Fisher Governor Company, a corporation of Iowa
Filed Jan. 28, 1965, Ser. No. 428,761
5 Claims. (Cl. 251—214)

ABSTRACT OF THE DISCLOSURE

A ball valve assembly including a unitary valve plug and shaft subassembly housed within a two piece body welded along a joinder line lying in a plane passing through the axes of the shafts of the valve plug and shaft subassembly. A flow ring having a contoured opening is provided adjacent to and upstream of the seal ring to take the pressure drop across the flow ring rather than across the seal ring and to prevent direct impingement of fluid against the seal ring, thus reducing wear and damage to the seal ring.

---

This invention relates to a ball valve assembly and, more particularly, to an improved ball valve assembly comprising a welded valve body, a one-piece valve plug and shaft subassembly housed within the valve body, and readily removable and replaceable bearing and seal means for the valve plug and shaft subassembly.

Heretofore, ball valve assemblies have comprised a unitary cast valve body within which a ball valve and the necessary stems for journaling the valves are mounted. A port in the valve body was sufficiently large to receive the generally spherical valve plug. Suitable ball valve seals were assembled through the inlet port or the outlet port to provide positive upstream seals for both high and low pressure service. By virtue of the separate connection of the shafts or stems to the valve plug there was lost motion between these elements. Accordingly, when a shaft was actuated by a suitable actuator, there was lost motion in actuation of the valve plug and inaccuracy in positioning of the valve plug. Difficulty was encountered in handling the many elements necessary to provide for replacement of the various seals and bearings.

To overcome some of the disadvantages of prior constructions, it was proposed to make a ball and shaft subassembly and then insert said subassembly into a valve body or housing formed from several parts welded together. These arrangements, though more satisfactory from the standpoint of somewhat reducing the assembly of the ball valve were not entirely satisfactory, for the seals could not be replaced easily. The ball and shaft subassembly was built up and not formed integrally from one piece. Thrust bearings were sometimes required due to unequal end forces on the stems by the process fluid. The bearings which supported the stems or shafts extending from opposite sides of the valve plug were not isolated from the process fluid and were thus subject to damage by the process fluid passing through the ball valve assembly.

An object of this invention is to provide an improved ball valve incorporating a one-piece ball and stem construction wherein the end forces against the stems are equalized and the need for friction-producing thrust bearings is obviated.

Another object of the present invention is to provide a ball valve having a one-piece ball and stem construction housed within a welded valve body construction, wherein the number of joints are reduced and the valve body is compact.

Still another object of the present invention is to provide a ball valve having a one-piece ball and stem construction incorporated in a welded body construction in such manner that the seals and bearings can be readily replaced.

A further object of the present invention is to provide an improved ball valve having a welded body construction and a one-piece ball and stem construction incorporated in the body construction, the stems of the ball and stem construction being supported in roller bearings which are isolated from the process fluid flowing through the ball valve.

Still another object of the present invention is to provide a ball valve with an annular flow ring adjacent the resilient seal ring for sealing between the valve plug and the interior of the valve body, such flow ring functioning to reduce the pressure drop across the seal ring and increase seal ring life when the ball valve operates at high pressure drops.

A further object of this invention is to provide a ball valve that is economical to build, such ball valve including a body formed from half sections welded together about a sturdy, unitary ball and shaft subassembly.

Yet another object of this invention is to provide an improved method of fabricating a ball valve. Other objects and attendant advantages of the present invention will readily be perceived hereafter.

The present invention will be more fully understood when the following portions of the specification are read in conjunction with the accompanying drawing, wherein:

FIGURE 1 is a side elevational view of the ball valve assembly embodying the principles of the present invention;

FIGURE 4 is an end view of the ball valve body taken generally along the line 4—4 of FIGURE 1 with the valve plug and shaft subassembly being omitted for clarity; and FIGURE 5 is an end view taken generally along the line 5—5 of FIGURE 1 and illustrating the mechanism for actuating the valve plug within the ball valve assembly.

Figure 2:
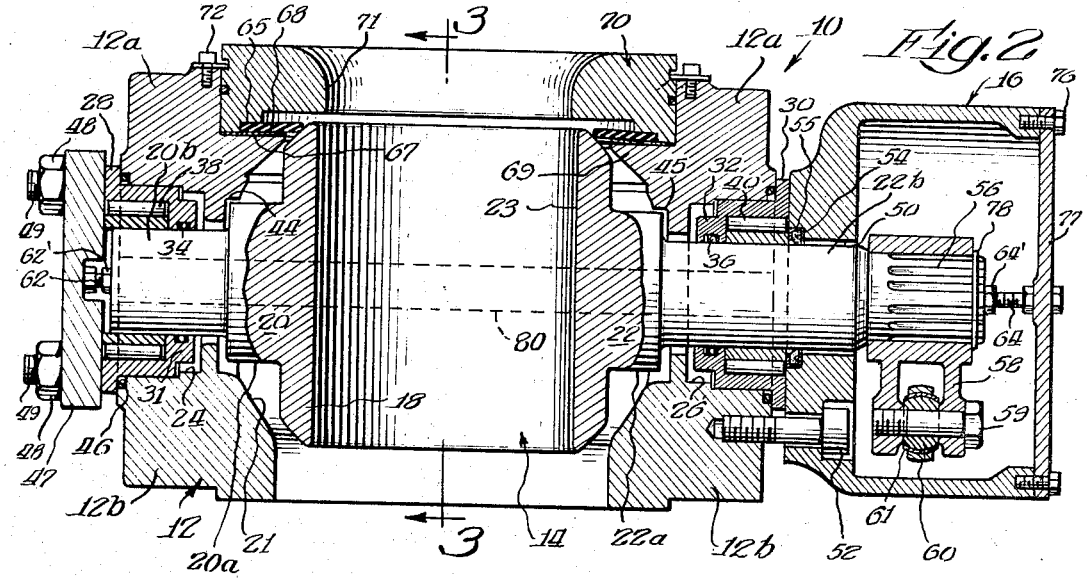
FIGURE 2 is a cross-sectional view of the ball valve assembly taken generally along the line 2—2 of FIGURE 1.

Referring now to FIGURE 1, there is illustrated a ball valve assembly embodying the present invention. The ball valve assembly 10, which is adapted to provide for throttling control of process fluid with tight shut-off at high pressure drops up to 1000 p.s.i., includes a valve body or housing 12, within which there is disposed an integral valve plug and shaft subassembly 14.

Joined to the valve body 12 at one end is an actuator mechanism comprising a housing 16 within which is disposed the means for rotating the valve plug and shaft subassembly to control the flow of fluid through the valve body 12.

Turning to FIGURE 2, it is seen that the valve plug and shaft subassembly 14 comprises a generally spherical valve plug 18 joined integrally at each end with valve stems or shafts 20 and 22, which extend from opposite sides of the valve plug 18 along a common axis. The valve plug is disposed in an enlarged generally spherical recess in flow passage 21 defined in body 12. Formed centrally within the valve plug 18 is a central flow opening 23 for process fluid passing through the valve body 12.

It will be noted that each valve stem or shaft 20 and 22, respectively, includes an enlarged portion 20a and 22a, respectively, and relatively smaller diameter portions 20b and 22b. The ends of the stems 20 and 22 extend into axially aligned bores 24 and 26 defined in the valve body 12.

Provided in each of the bores 24 and 26 are tubular sleeve members 28 and 30, respectively. The sleeve members 28 and 30 each include an inwardly disposed flange member 31 and 32, respectively. Within each flange member is a recess for receiving a resilient O-ring-type seal 34 and 36, respectively. Carried in the sleeve members 28 and 30 are roller bearings 38 and 40, which engage with portions 20b and 22b of the shafts and journal the shafts or stems 20 and 22, respectively, for rotation within the valve body 12. The roller bearings 38 and 40 are isolated from fluid flowing through the valve body 12 by sleeve members 28 and 30, respectively, and seal members 34 and 36, respectively, and therefore bearing life increased.

It is to be noted that the abutment shoulders are defined between enlarged portions 20a and 22a, respectively, and the portions 20b and 22b, respectively, of the valve stems 20 and 22. The abutment shoulders on the shafts are formed complementary to adjacent valve body shoulders 44 and 45, respectively, formed in one section of body 12 for limiting movement of the valve plug axially and transversely of the shafts within the body so as to facilitate fabrication of the unitized valve body as will be more fully explained hereafter.

The sleeve member 28 is retained in place by cover member 47 which is affixed to the valve body 12 by suitable connecting means, which in the illustrated form of the invention comprise nuts 48 affixed to studs 49 extending from the valve body 12. Seal means 46, which may take the form of a resilient O-ring, are provided to prevent leakage between sleeve member 28 and body 12.

The actuator housing 16 is provided with an opening 50 for receiving the extended end portion 22b of the shaft 22. The housing 16 is affixed to the valve body by means including machine screws 52, and the face of the housing 16 abuts member 30 and functions to retain sleeve member 30 and the roller bearing 40 in place in the valve body 12. Additional seal means 54 are provided in a recess 55 in the face of the housing 16 to retain grease in the bearing 40 and prevent dirt and grease from getting into the bearing 40.

The end of portion 22b of the shaft 22 is splined, as indicated at 56, to permit affixation thereto of the link arm 58, which is adapted to be connected to the actuating arm 60 by pivot pin 59 and journal means 61 for facilitating rotation of the valve plug within the valve body 12.

Adjustable screw positioning means 62 and 64, respectively, including lock nuts 62' and 64', are affixed to the ends of the shafts 20 and 22 for accurately locating the valve plug and shaft subassembly within the valve body 12 between valve body shoulders 44 and 45 and for positioning the valve plug so as to prevent it from contacting the flow ring 70 in use.

Provided in a recess 65 in a side of the flow ring 70 is an annular resilient seal member 68 which is adapted to engage the exterior surface of the valve plug 18 adjacent the inlet to the valve body and prevent the passage of fluid into the flow path between the exterior of the valve plug 18 and the interior of the flow passage defined by the surface of the bore through the valve body 12 when the valve plug is in closed position. When the valve plug is in the throttling position, fluid can pass around the outside of the valve plug and contact the inside of the body 12 and flow out through the downstream piping. The annular seal ring or valve seat 68 abuts shims 67 which are supported on abutment shoulder 69 in valve body 12. The seal ring 68 is retained in position by an annular flow ring 70 which is affixed to the valve body 12 by means including machine screws 72 which are adapted to retain washers 73 in engagement within a peripheral recess 74 in the exterior surface of flow ring 70.

The flow ring 70 not only serves to retain the annular ring 68 is position but also functions to reduce the pressure drop across the valve seat ring 68 in use. Reduction of the pressure drop across the valve seat ring 68 increases the life of the valve seat when the ball valve is operating at high pressure drops. The inner diameter of the flow ring may be less than the inner diameter of the bore 23 extending through the valve plug 18 (as shown) or may be equal to the inner diameter of bore 23. In use, the valve plug 18 will be rotated from the position illustrated in FIGURE 2, wherein the valve plug bore 23 is in axial alignment with the circular inlet opening 71 defined in the flow ring 70 to a position wherein the bore 23 in the valve plug 18 extends at right angles to the position illustrated (that is, when the valve plug 18 is rotated 90° with respect to the opening 71). In the intermediate positions of travel, the area of the opening between the valve plug 18 and the flow ring 70 is less than between the valve plug 18 and the seal member 68. By reason of this arrangement of components, the pressure drop is taken across the flow ring 70 and the valve plug 18 rather than across the seal means 68. The present construction reduces wear and damage to the seal member 68 during throttling at high pressure drops.

It will be noted that the diameters of the corresponding portions 20a and 22a of the shafts 20 and 22 are the same. Thus, the effective areas of the shafts acted upon by the pressure downstream of the ball valve and at either side of the valve plug 18 are equal. The end forces acting upon the valve plug 18 are equalized and therefore the need for friction-producting thrust bearings is obviated.

Referring to FIGURE 5, the link arm 58 is operatively connected to shaft end 22 of subassembly 14. Actuating arm 60 is connected at one end to the link arm 58 by pivot pin 59. The other end of arm 60 extends through opening 75 in housing 16 and is adapted to be affixed to a suitable positioner control.

The actuating means for rotating the valve plug are directly connected to the shaft 22, which is formed integrally with valve plug 14. This construction results in virtually no lost motion, as often occurs in arrangements where the valve stem 22 is separately connected to the valve plug 18. Lost motion results in inaccurate positioning of valve plug 18 in flow passage 21.

Replacement of the bearings 38 and 40 and/or seals 34 and 36 is simplified by the present design. First, cover 47 or housing is removed. Considering first removal of the cover 47, it will be noted that the nuts 48 are removed from the studs 49 extending from the valve body 12 and the bearing 38 are then accessible for removal from the valve body. The seal 34 is accessible for replacement upon removal of the sleeve 28 from the bore 24 defined in the valve body 12.

Replacement or repair of bearing 40 and/or seal 36 may be made by removing housing 16 from engagement with the valve body 12. This can be done by removing the machine screws 76 (FIGURES 1 and 2) which retain the cover 77 to the housing 16, removing the retaining ring 78 and the actuating arm 58, and then removing the bolts 52 to free the housing 16 from the valve body 12. Sleeve member 30 can be slid from the end of shaft 22 to facilitate repair or replacement of either seal 36 or roller bearing 40.

Figure 3:
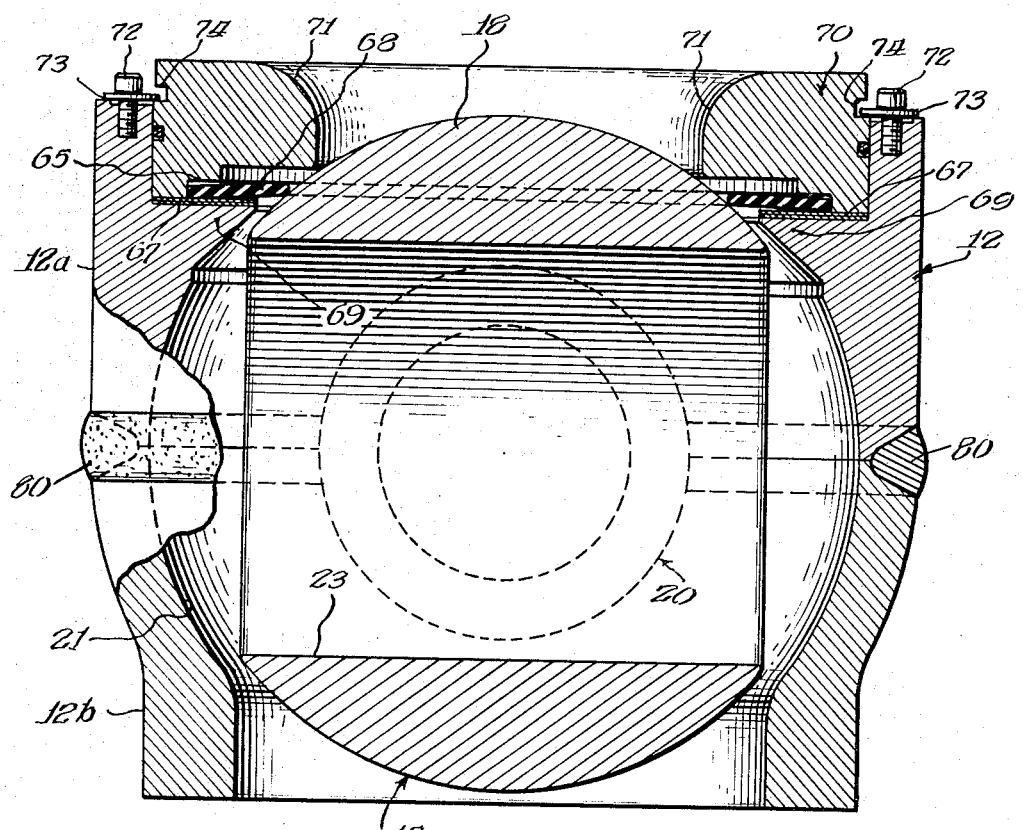
FIGURE 3 is a cross-sectional view taken generally along line 3—3 of FIGURE 2 with the valve plug shown closed.

Turning now to FIGURES 3 and 4, there is best seen the valve body construction of the present invention. The valve body 12 comprises a pair of half sections 12a and 12b which are adapted to be welded together around the finished valve plug and shaft subassembly 14 along a plane passing through the axis of the shafts 20 and 22. The adjoining surfaces of the valves 12a and 12b comprising the valve body are contoured so as to make a weld 80 of constant cross section. By virtue of the welded body construction, the number of joints are reduced and there is provided a relatively compact body 12.

To fabricate the ball valve, the separate halves 12a and 12b of the valve body are formed and suitably machined, such that when the halves are connected a flow passage is defined having an enlarged generally spherical portion for receiving valve plug 18 and bores 24 and 26 are formed for receiving stems 20 and 22.

The subassembly 14 comprises a valve plug 18 having stems extending integrally from opposite sides of the valve plug along a common axis. This construction simplifies machining by reducing the number of parts and by allowing the valve plug to be lathe turned between centers. Furthermore, with the valve plug and shafts integrally formed, a seal of the same diameter can be made at each end of the shafts, thus equalizing the hydrostatic end forces and eliminating the need for a thrust bearing.

The subassembly 14 is positioned between the separate halves 12a and 12b of valve body 12, with the shoulders defined by the surface between the enlarged and reduced portions of shafts 20 and 22 being disposed adjacent shoulders 44 and 45, respectively, in the valve body. The shoulders limit movement of the valve plug both axially and transversely of the valve body during assembly and machining operations.

The sections of the valve body are welded together as indicated at 80 in FIGURE 3 on the centerline of the body and along a plane passing through the axis of shafts 20 and 22. The body is contoured so as to make a weld of constant cross section. It will be understood that the sections of the valve body can be joined in a plane other than one passing through the axis of the shafts.

The ball valve of the present invention is capable of high capacity even at low pressure drops and provides tight shut-off at pressure drops up to 1000 p.s.i. The ball valve may be used on such applications as gas transmission lines, town border stations, pump discharge liquid pipelines and many other installations where high capacity is required with low pressure drops.

Incorporated within a welded body construction is a rugged one-piece ball and stem subassembly constructed and arranged to equalize end forces imposed upon the subassembly, with the actuator stem being directly connected to the valve plug to assure no lost motion in the subassembly.

The ball stems or shafts are journaled in roller bearings which are isolated from the process fluid passing through the ball valve. The stem seals and the bearings are readily removable from the valve body for repair and replacement, without removing the valve plug and stem subassembly from the valve body and without removing the valve body from the line.

An annular flow ring is provided in the inlet to the ball valve and adjacent to the annular seat ring to reduce the pressure drop across the seat ring and increases the life of the seat ring when the ball valve operates at high pressure drops.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

I claim:

1. A ball valve assembly comprising a unitary valve plug and shaft subassembly including a valve plug having a central opening therethrough and a generally spherical outer contour, and shafts extending outwardly from opposite sides of said valve plug along a common axis for supporting said valve plug for rotation, a valve body having a flow passage therethrough and an enlarged generally spherical recess defined in said flow passage for receiving said valve plug, said valve body including an inlet and an outlet each less in cross-sectional area than the cross section of the valve plug, said valve body also including means defining a pair of aligned bores for receiving said shafts, said valve body being comprised of a pair of sections joined together by a weld in a single plane passing through the axis of the shaft means to form a unitized valve body for permanently retaining the valve plug and shaft subassembly, annular seal means in said valve body abutting said valve plug for preventing flow between the valve plug and the valve body when the valve plug is in the closed position, seal means of the same cross-sectional area for the inner end of each shaft, said shaft seal means equalizing the hydrostatic forces applied to the ends of the shafts and thereby obviating the need for thrust bearings, and actuating means connected to one of said shafts for rotating the valve plug.

2. A ball valve assembly as in claim 1 including bearing means in each bore for journalling a shaft, said shaft seal means being disposed in said bores for sealing said bearing means from fluid in said flow passage, said bearing means and said seal means being removably and replaceably retained in each said bore by cover means detachably connected to said valve body, whereby upon removal of a selected one of said cover means, the associated bearing means and seal means can be replaced.

3. A ball valve assembly as in claim 1 wherein the body valve sections are contoured for receiving a weld of constant cross section along the plane of joinder of the two valve body sections.

4. A ball valve assembly as in claim 1 wherein an annular flow ring is disposed in said valve body at the inlet to said flow passage adjacent to and upstream of said seal means, said flow ring having a nozzle-like opening therethrough of smaller diameter at the downstream end than the diameter of the opening through said annular seal means for preventing pressure drop from being taken across the annular seal means and for preventing fluid impingement upon the annular seal means.

5. In a ball valve assembly including a valve body having a flow passage therethrough, a spherical valve plug in said flow passage for controlling the flow of fluid through said flow passage, said valve plug having a flow bore therethrough circular in cross section, and annular seal means disposed between said valve body and said valve plug, the improvement comprising an annular flow ring disposed in said flow body adjacent to and upstream of said annular seal means and of said valve plug, said flow ring being adjacent the valve plug and having a nozzle-like opening therethrough circular in cross section, said seal means having an opening therethrough circular in cross section, said flow ring opening being contoured and the downstream end of said flow ring opening having a diameter slightly smaller than the diameter of said seal means opening, whereby the pressure drop is taken across the flow ring rather than across the seal means and direct impingement of fluid against the annular seal means is prevented, thus reducing wear and damage to the seal means during throttling at high pressure drops.

References Cited

UNITED STATES PATENTS

| | | | |
|---|---|---|---|
| 715,113 | 12/1902 | Mitchell | 251—315 X |
| 2,989,990 | 6/1961 | Bass | 251—172 X |
| 3,023,783 | 3/1962 | Vickery | 251—315 X |
| 3,172,192 | 3/1965 | Dresden | 29—157.1 |
| 3,208,718 | 9/1965 | White | 251—172 |
| 3,218,024 | 11/1965 | Kroekel | 251—315 X |
| 3,235,226 | 2/1966 | Allen | 251—309 |
| 3,272,472 | 9/1966 | Goldman | 251—172 |
| 3,286,981 | 11/1966 | Brice | 251—315 |

CLARENCE R. GORDON, *Primary Examiner.*